United States Patent
Byun et al.

(10) Patent No.: US 11,129,228 B2
(45) Date of Patent: Sep. 21, 2021

(54) METHOD AND DEVICE FOR DETERMINING RRC STATE

(71) Applicant: LG ELECTRONICS INC., Seoul (KR)

(72) Inventors: Bokyung Byun, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/483,373

(22) PCT Filed: Feb. 2, 2018

(86) PCT No.: PCT/KR2018/001418
§ 371 (c)(1),
(2) Date: Aug. 2, 2019

(87) PCT Pub. No.: WO2018/143709
PCT Pub. Date: Aug. 9, 2018

(65) Prior Publication Data
US 2019/0387570 A1 Dec. 19, 2019

Related U.S. Application Data

(60) Provisional application No. 62/453,536, filed on Feb. 2, 2017.

(51) Int. Cl.
*H04W 76/27* (2018.01)
*H04W 76/11* (2018.01)
(Continued)

(52) U.S. Cl.
CPC .............. *H04W 76/27* (2018.02); *H04W 8/08* (2013.01); *H04W 68/02* (2013.01); *H04W 76/11* (2018.02)

(58) Field of Classification Search
CPC ........ H04W 76/27; H04W 76/11; H04W 8/08; H04W 68/02
See application file for complete search history.

(56) References Cited

U.S. PATENT DOCUMENTS

2011/0244823 A1* 10/2011 Chen ...................... H04W 68/00
455/404.1
2011/0244902 A1* 10/2011 Kim ....................... H04W 76/11
455/507

(Continued)

OTHER PUBLICATIONS

3GPP TSG-RAN WG2 Meeting #96 Reno, Nevada Nov. 14-18, 2016 R2-168541, Ericsson "RRC Paging message for Light connection" (Year: 2016).*

(Continued)

*Primary Examiner* — Kevin M Cunningham
(74) *Attorney, Agent, or Firm* — Lee, Hong, Degerman, Kang & Waimey

(57) ABSTRACT

Provided are a method by which an access stratum (AS) layer of a terminal determines a radio resource control (RRC) state in a wireless communication system, and a device for supporting the same. The method can comprise the steps of: entering an RRC_INACTIVE state; receiving, from a core network (CN), CN paging in the RRC_INACTIVE state; forwarding a UE ID of the terminal and a CN domain to a non-access stratum (NAS) layer of the terminal; receiving an RRC connection release request from the NAS layer of the terminal; and entering an RRC_IDLE state on the basis of the received RRC connection release request.

12 Claims, 10 Drawing Sheets

(51) Int. Cl.
*H04W 8/08* (2009.01)
*H04W 68/02* (2009.01)

(56) References Cited

U.S. PATENT DOCUMENTS

| | | | | |
|---|---|---|---|---|
| 2012/0002650 | A1* | 1/2012 | Yanagisako | H04W 24/02 370/338 |
| 2015/0257161 | A1 | 9/2015 | Hsu et al. | |
| 2016/0337957 | A1* | 11/2016 | Gonsalves | H04W 8/24 |
| 2018/0317202 | A1* | 11/2018 | Chang | H04W 52/0229 |
| 2019/0174571 | A1* | 6/2019 | Deenoo | H04W 36/30 |

OTHER PUBLICATIONS

European Patent Office Application Serial No. 18747129.7, Search Report dated Sep. 26, 2019, 11 pages.
LG Electronics, "Paging for a UE in RRC_INACTIVE", 3GPP TSG RAN WG2 Meeting NR AH, R2-1801363, Jan. 2018, 3 pages.
LG Electronics, "Paging response to CN paging in lightweight connection", 3GPP TSG RAN WG2 Meeting #97, R2-1701821, Feb. 2017, 2 pages.
Ericsson, "Paging in RRC_INACTIVE", 3GPP TSG RAN WG2 NR AH Meeting #3, R2-1800361, Jan. 2018, 4 pages.
Ericsson, "Signalling flows for paging and resume for RRC_INACTIVE", 3GPP TSG RAN WG2 AH, R2-1700536, Jan. 2017, 7 pages.
LG Electronics, "UE Initial Access procedure for RRC connection resume", 3GPP TSG RAN WG3 Meeting #98, R3-174378, Dec. 2017, 6 pages.
PCT International Application No. PCT/KR2018/001418, International Search Report dated May 14, 2018, 4 pages.
Ericsson, "CN and RAN interactions for RRC_INACTIVE UEs", 3GPP TSG RAN WG2 Meeting #96, R2-168710, Nov. 2016, 6 pages.
Ericsson, "RRC Suspend/Resume for Light Connection", 3GPP TSG RAN WG2 Meeting #96, R2-168480, Nov. 2016, 5 pages.
Kim, J. et al., "Mobility Management in 5G Networks", OSIA S&TR Journal, vol. 29, No. 4, Dec. 2016, 22 pages.
Ericsson, "Baseline solution for small data transmission in RRC_INACTIVE", 3GPP TSG RAN WG2 Meeting #96, R2-168713, Nov. 2016, 9 pages.

* cited by examiner

METHOD AND DEVICE FOR DETERMINING RRC STATE

CROSS-REFERENCE TO RELATED APPLICATIONS

This application is the National Stage filing under 35 U.S.C. 371 of International Application No. PCT/KR2018/001418, filed on Feb. 2, 2018, which claims the benefit of U.S. Provisional Application No. 62/453,536, filed on Feb. 2, 2017, the contents of which are hereby incorporated by reference herein in its entirety.

BACKGROUND OF THE INVENTION

Field of the Invention

The present invention relates to a wireless communication system and, most particularly, to a method for determining, by a user equipment (UE), an RRC state corresponding to CN-based paging and a device for supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

Technical Objects

Meanwhile, in general cases, a UE in an RRC_INACTIVE state may respond to RAN-based paging. However, in case a mis-synchronization occurs between a UE and a RAN, a UE in the RRC_INACTIVE state shall be reachable not only to RAN-based paging but also CN-based paging. However, the transmission of a CN-based paging to a UE in the RRC_INACTIVE state may influence the UE operations. Therefore, in case the UE in the RRC_INACTIVE state receives a CN-based paging, respective UE operations (or behaviors) need to be proposed accordingly.

Technical Solutions

According to an exemplary embodiment of the present invention, provided herein is a method for determining, by an access stratum (AS) layer of a user equipment (UE), a radio resource control (RRC) state in a wireless communication system. The method may include the steps of entering an RRC_INACTIVE state, receiving core network (CN) paging during the RRC_INACTIVE state from a core network (CN), forwarding a UE ID of the UE and a CN domain to a non-access stratum (NAS) layer of the UE, receiving an RRC connection release request from the NAS layer of the UE, and entering an RRC_IDLE state, based on the received RRC connection release request.

According to another exemplary embodiment of the present invention, provided herein is a user equipment (UE) determining a radio resource control (RRC) state in a wireless communication system. The user equipment (UE) may include a memory, a transceiver, and a processor operatively connecting the memory and the transceiver, wherein the processor may enter an RRC_INACTIVE state, control the transceiver so as to allow the transceiver to receive core network (CN) paging during the RRC_INACTIVE state from a core network (CN), wherein a UE ID of the UE and a CN domain may be forwarded to a non-access stratum (NAS) layer of the UE, and wherein an RRC connection release request may be received from the NAS layer of the UE, and enter an RRC_IDLE state, based on the received RRC connection release request.

Effects of the Invention

A user equipment (UE) in an RRC_INACTIVE state may respond to CN-based paging.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
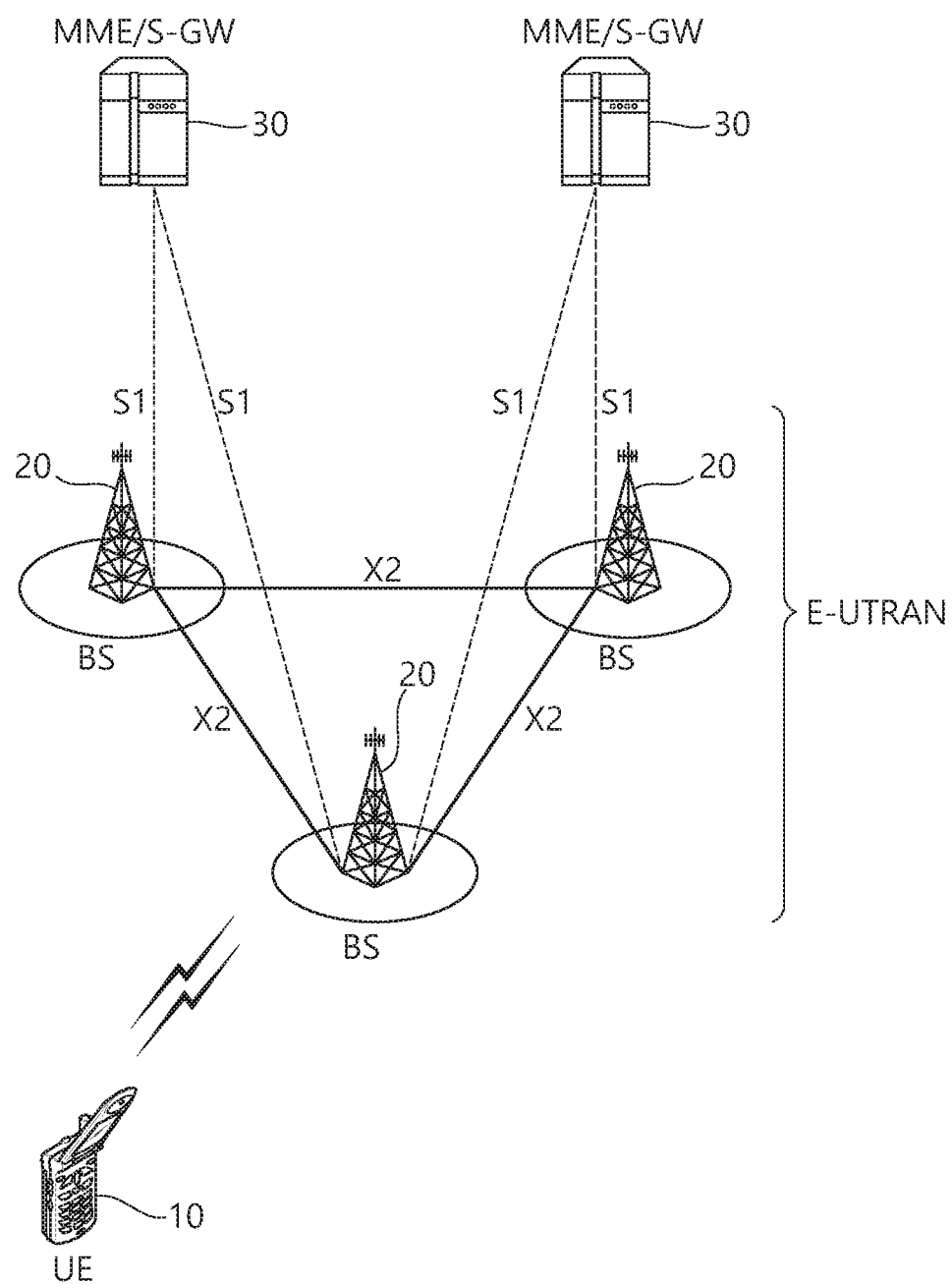
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE) (10), an evolved-UMTS terrestrial radio access network (E-UTRAN) and an evolved packet core (EPC). The UE (10) refers to a communication equipment carried by a user. The UE (10) may be fixed or mobile, and may be referred to as another terminology, such as a mobile station (MS), a user terminal (UT), a subscriber station (SS), a wireless device, etc.

The E-UTRAN includes one or more evolved node-B (eNB) (20), and a plurality of UEs may be located in one cell. The eNB (20) provides an end point of a control plane and a user plane to the UE (10). The eNB (20) is generally a fixed station that communicates with the UE (10) and may be referred to as another terminology, such as a base station (BS), a base transceiver system (BTS), an access point, etc. One eNB (20) may be deployed per cell. There are one or more cells within the coverage of the eNB (20). A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB (20) to the UE (10), and an uplink (UL) denotes communication from the UE (10) to the eNB (20). In the DL, a transmitter may be a part of the eNB (20), and a receiver may be a part of the UE (10). In the UL, the transmitter may be a part of the UE (10), and the receiver may be a part of the eNB (20).

The EPC includes a mobility management entity (MME) which is in charge of control plane functions, and a system architecture evolution (SAE) gateway (S-GW) which is in charge of user plane functions. The MME/S-GW (30) may be positioned at the end of the network and connected to an external network. The MME has UE access information or UE capability information, and such information may be primarily used in UE mobility management. The S-GW is a gateway of which an endpoint is an E-UTRAN. The MME/S-GW (30) provides an end point of a session and mobility management function for the UE (10). The EPC may further include a packet data network (PDN) gateway (PDN-GW). The PDN-GW is a gateway of which an endpoint is a PDN.

The MME provides various functions including non-access stratum (NAS) signaling to eNBs (20), NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW (30) will be referred to herein simply as a "gateway," but it is understood that this entity includes both the MME and S-GW.

Interfaces for transmitting user traffic or control traffic may be used. The UE (10) and the eNB (20) are connected by means of a Uu interface. The eNBs (20) are interconnected by means of an X2 interface. Neighbor eNBs may have a meshed network structure that has the X2 interface. The eNBs (20) are connected to the EPC by means of an S1 interface. The eNBs (20) are connected to the MME by means of an S1-MME interface, and are connected to the S-GW by means of S1-U interface. The S1 interface supports a many-to-many relation between the eNB (20) and the MME/S-GW.

The eNB (20) may perform functions of selection for gateway (30), routing toward the gateway (30) during a radio resource control (RRC) activation, scheduling and transmitting of paging messages, scheduling and transmitting of broadcast channel (BCH) information, dynamic allocation of resources to the UEs (10) in both UL and DL, configuration and provisioning of eNB measurements, radio bearer control, radio admission control (RAC), and connection mobility control in LTE_ACTIVE state. In the EPC, and as noted above, gateway (30) may perform functions of paging origination, LTE_IDLE state management, ciphering of the user plane, SAE bearer control, and ciphering and integrity protection of NAS signaling.

Figure 2:
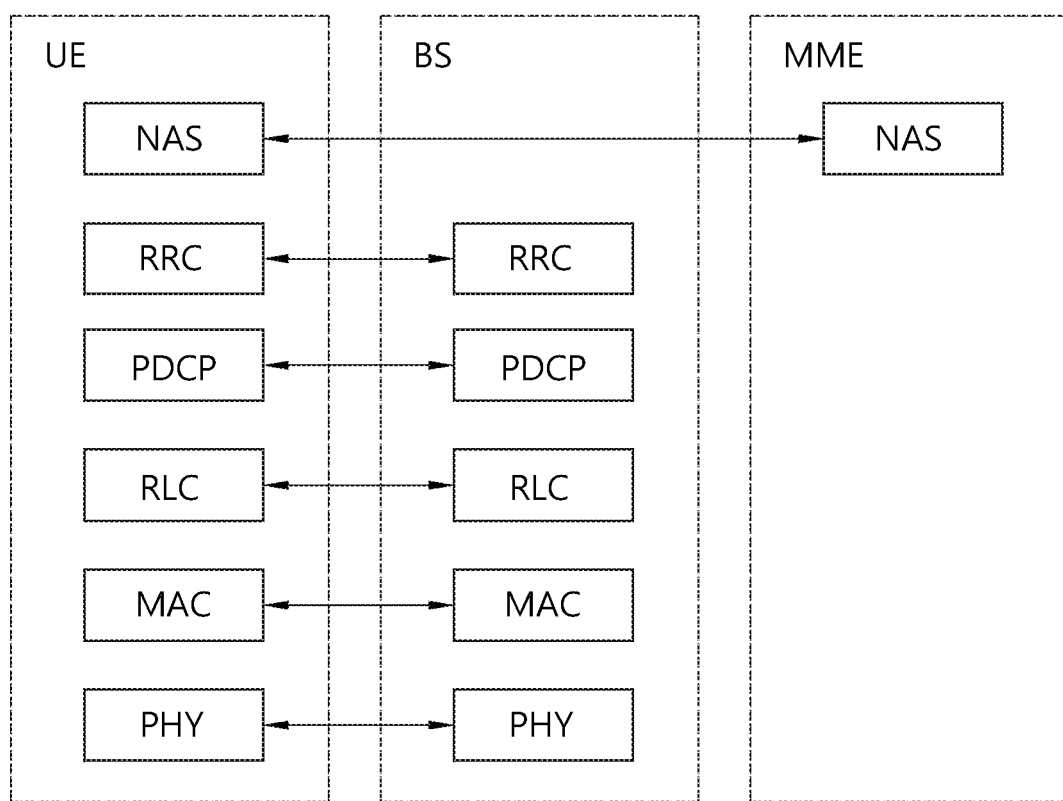
FIG. 2 shows a control plane of a radio interface protocol of an LTE system.
Figure 3:
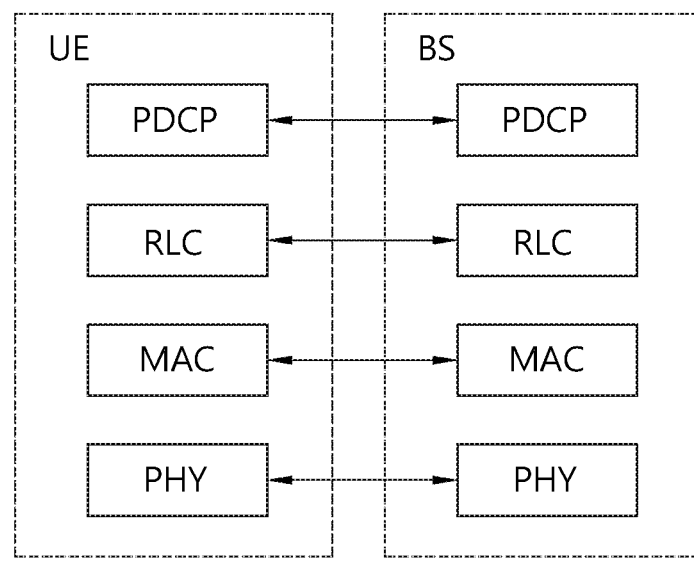
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and an RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE needs to transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G network structure is described.

Figure 4:
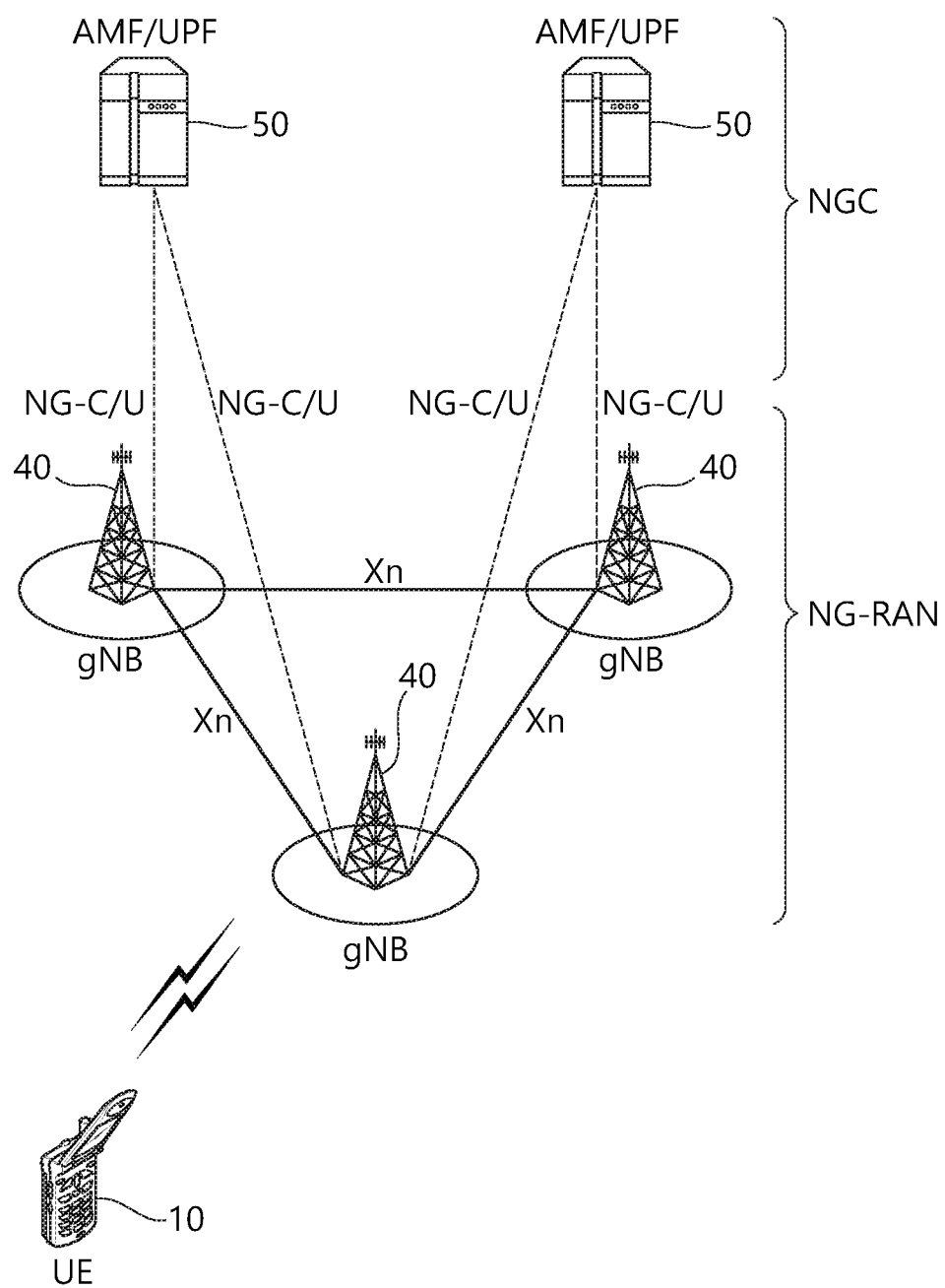
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NG-C interface, and may be connected to a UPF by means of an NG-U interface. The NG interface supports a many-to-many-relation between the gNB (40) and the AMF/UPF (50).

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, paging will be described.

A paging procedure may be used for a network to transmit paging information to a UE in RRC_IDLE. Alternatively, a paging procedure may be used for a network to report a change in system information to a UE in RRC_IDLE/RRC_CONNECTED. Alternatively, a paging procedure may be used for a network to report an ETWS primary notification and/or an ETWS secondary notification to a UE in RRC_IDLE/RRC_CONNECTED. Alternatively, a paging procedure may be used for a network to report a CMAS notification to a UE in RRC_IDLE/RRC_CONNECTED.

Figure 5:
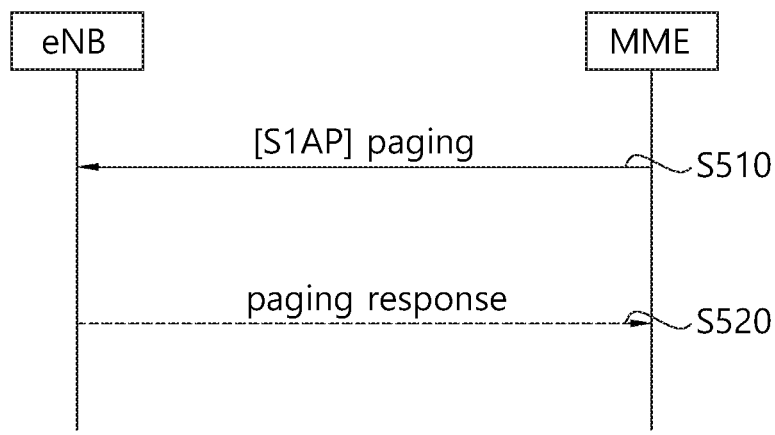
FIG. 5 shows an example of a paging procedure.

FIG. 5 shows an example of a paging procedure.

Referring to FIG. 5, in step S510, an MME may transmit a paging message to an eNB, thereby starting a paging procedure. The paging message may also be referred to as an S1AP paging message. The location of a UE in an ECM-IDLE state is managed by the MME on the basis of a TA. Here, since the UE may be registered in one or more TAs, the MME may transmit the paging message to a plurality of eNBs covering a cell belonging to the TA(s) in which the UE is registered. Here, each cell can belong to only one TA, and each eNB may include cells belonging to different TAs.

In step S520, a paging response to be transmitted to the MME may be initiated in an NAS layer and may be transmitted by the eNB on the basis of NAS-level routing information. That is, the paging response may correspond to a service request NAS message transmitted from the UE.

Table 1 below illustrates an example of an S1AP paging message.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |

TABLE 1-continued

| IE/Group Name | Presence | Range | IE type and reference | Semantics description | Criticality | Assigned Criticality |
|---|---|---|---|---|---|---|
| List of TAIs | | 1 | | | YES | ignore |
| >TAI List Item | | 1 . . . <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 . . . <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

The Message Type IE may uniquely identify a transmitted message.

The UE Identity Index value IE may be used for an eNB to compute a paging frame (PF). For example, UE Identity Index=UE IMSI mod 1024.

The UE Paging Identity IE is an identifier for identifying a paged UE and may be either an International Mobile Subscriber Identity (IMSI) or an SAE Temporary Mobile Subscriber Identity (S-TMSI). An S-TMSI refers to an identifier for uniquely identifying a UE in a single MME group. In general paging, an S-TMSI is used as a UE paging identifier. When an IMSI is used as a UE paging identifier, paging includes the IMSI. When paged with an IMSI value, the UE may perform a re-attach procedure.

The Paging DRX IE may be used for an eNB to compute a PF when a UE uses a UE-specific DRX cycle length. The UE may specify the DRX cycle length via an attach request message or a TAU message.

The CN Domain IE may indicate whether paging occurs in a circuit switched (CS) or a packet switched (PS) domain.

The tracking area identity (TAI) List IE may be used for an MME to report to an eNB a TA in which a paging message needs to be broadcast. A TAI refers to an identifier used for uniquely identifying a TA.

The closed subscriber group (CSG) ID List IE may indicate a CSG set that a UE joins. This IE is used to prevent an eNB from paging a UE in a CSG cell that the UE does not join.

Upon receiving the S1AP paging message from the MME, the eNB may construct a paging message. The paging message may be referred to as an RRC paging message or paging information. Table 2 illustrates an example of a paging message constructed by the eNB.

TABLE 2

```
-- ASN1START
Paging ::=                         SEQUENCE {
    pagingRecordList                   PagingRecordList OPTIONAL,       -- Need ON
    systemInfoModification             ENUMERATED {true}      OPTIONAL, -- Need ON
    etws-Indication                    ENUMERATED {true}      OPTIONAL, -- Need ON
    nonCriticalExtension               Paging-v890-IEs        OPTIONAL  -- Need OP
}
Paging-v890-IEs ::=                SEQUENCE {
    lateNonCriticalExtension           OCTET STRING           OPTIONAL, -- Need OP
    nonCriticalExtension               Paging-v920-IEs        OPTIONAL  -- Need OP
}
Paging-v920-IEs ::=                SEQUENCE {
    cmas-Indication-r9                 ENUMERATED {true}      OPTIONAL, -- Need ON
    nonCriticalExtension               Paging-v1130-IEs       OPTIONAL  -- Need OP
}
Paging-v1130-IEs ::=               SEQUENCE {
    eab-ParamModification-r11          ENUMERATED {true}      OPTIONAL, -- Need ON
    nonCriticalExtension               SEQUENCE { }           OPTIONAL  -- Need OP
}
PagingRecordList ::=               SEQUENCE (SIZE (1..maxPageRec)) OF PagingRecord
PagingRecord ::=                   SEQUENCE {
    ue-Identity                        PagingUE-Identity,
    cn-Domain                          ENUMERATED             {ps, cs},
    ...
}
PagingUE-Identity ::=              CHOICE {
    s-TMSI                             S-TMSI,
    imsi                               IMSI,
    ...
}
IMSI ::=                           SEQUENCE (SIZE (6..21)) OF IMSI-Digit
IMSI-Digit ::=                     INTEGER (0..9)
-- ASN1STOP
```

When the RRC paging message is constructed, the eNB may downlink control information (DCI), to which a cyclic redundancy check (CRC) scrambled with a paging-RNTI (P-RNTI) is attached, to the UE via a PDCCH and may transmit the RRC paging message to the UE via a PDSCH. That is, the eNB may transmit the RRC paging message to the UE through a PCCH of a logical channel, a PCH of a transmission channel, and a PDSCH of a physical channel.

The UE may monitor a PDCCH in a subframe belonging to a paging occasion of the UE on the basis of the P-RNTI. When the PDCCH masked with the P-RNTI is detected, the UE may decode the DCI transmitted on the PDCCH. The DCI may indicate a PDSCH resource via which the paging message is transmitted to the UE. The UE may decode the RRC paging message from the PDSCH resource indicated by the DCI.

A paging cycle may be determined to be cell-specific and may also be determined to be UE-specific. Further, a paging occasion may be determined for each UE on the basis of the paging cycle of each UE and an identifier (that is, IMSI) of each UE. Thus, the eNB may not transmit the paging message to all UEs on possible paging occasions but may transmit the paging message on a paging occasion set for a corresponding UE.

Hereinafter, an RRC_INACTIVE state of a UE is described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and an NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

For a UE in a lightly connected mode, an MME may maintain the S1 connection of the activated UE in order to hide a state transition and mobility from a core network. That is, for a UE in the RRC_INACTIVE state, an AMF may maintain the NG connection of the activated UE in order to hide a state transition and mobility from a next-generation core (NGC). In this specification, an RRC_INACTIVE state may be similar in concept to a lightly connected mode, a lightweight connected mode, or a semi-connected mode.

Meanwhile, in general cases, a UE in an RRC_INACTIVE state may respond to RAN-based paging. However, for example, if the UE is switched off without any detach procedure, or if the UE moves out of a RAN notification area after entering out of service state, a mis-synchronization may occur between the UE and the RAN. In this specification, the RAN-based paging may correspond to a paging initiated by a RAN, and the RAN may correspond to a base station, an eNB, or a gNB. In this specification, RAN-based paging may also be referred to as RAN-based notification, RAN-initiated paging, RAN-initiated notification, RAN paging, or RAN notification.

Figure 6:
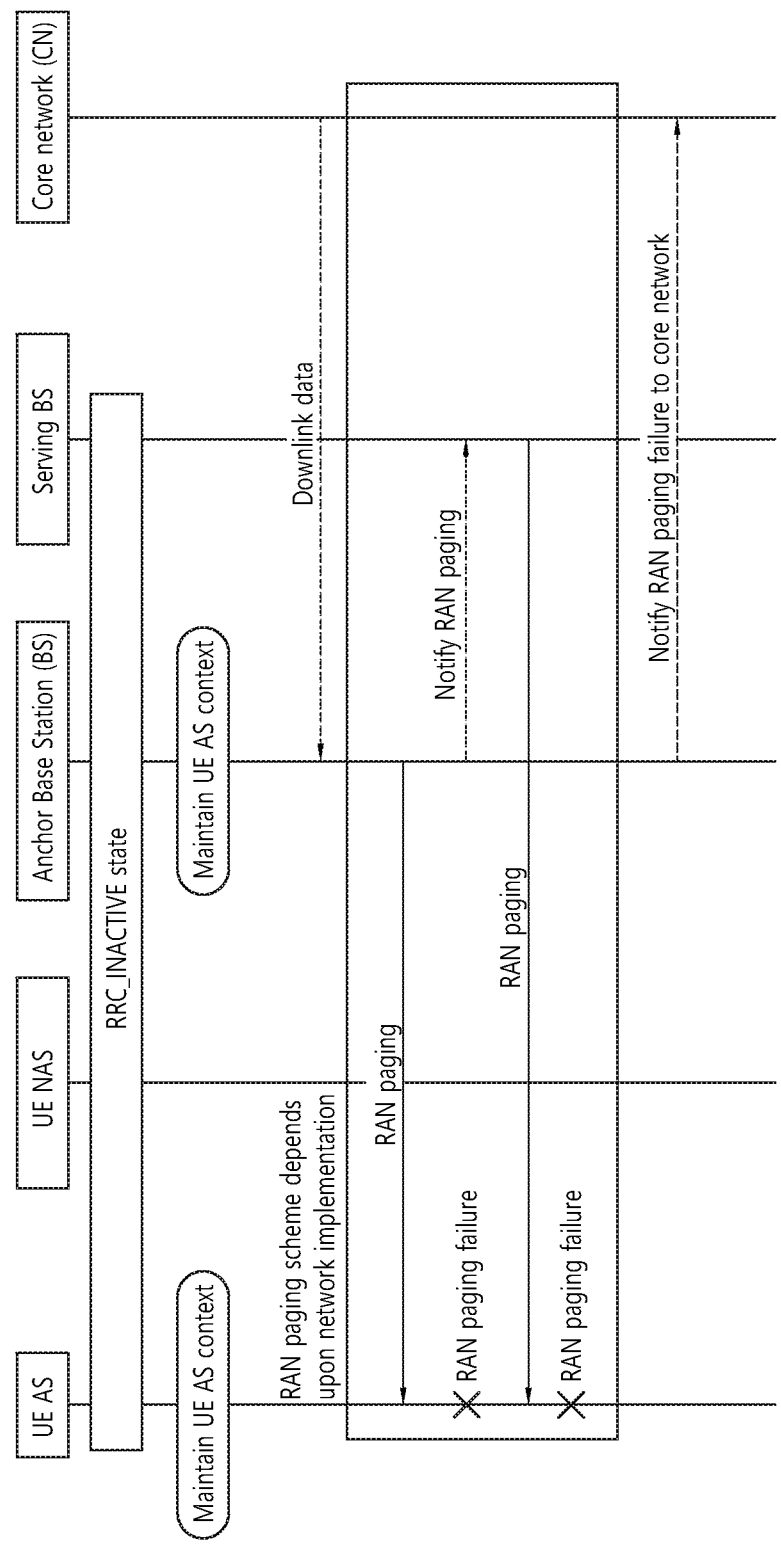
FIG. 6 shows an example where a user equipment (UE) in an RRC_INACTIVE state fails to receive RAN-based paging.

FIG. 6 shows an example where a user equipment (UE) in an RRC_INACTIVE state fails to receive RAN-based paging.

In order to resolve the above-described abnormal situation, the UE in the RRC_INACTIVE state shall be reachable not only to RAN-based paging but also to CN-based paging. Problems similar to the above-described problems may also be generated in a UE being in a lightweight connection mode of LTE. In this specification, the CN-based paging may correspond to a paging initiated by a core network (CN), and the core network (CN) may correspond to an Access and Mobility Function (AMF). In this specification, the CN-based paging may also be referred to as CN-based notification, CN-initiated paging, CN-initiated notification, CN paging, or CN notification.

A transmission of CN-based paging to a UE in the RRC_INACTIVE may influence (or cause impact) the UE operations (or behaviors). Therefore, in case the UE in the RRC_INACTIVE state receives the CN-based paging, respective UE operations (or behaviors) need to be proposed accordingly. Hereinafter, according to an exemplary embodiment of the present invention, a method for determining an RRC state by UE in an RRC_INACITVE receiving a CN paging and a device for supporting the same will be described in detail.

Figure 7:
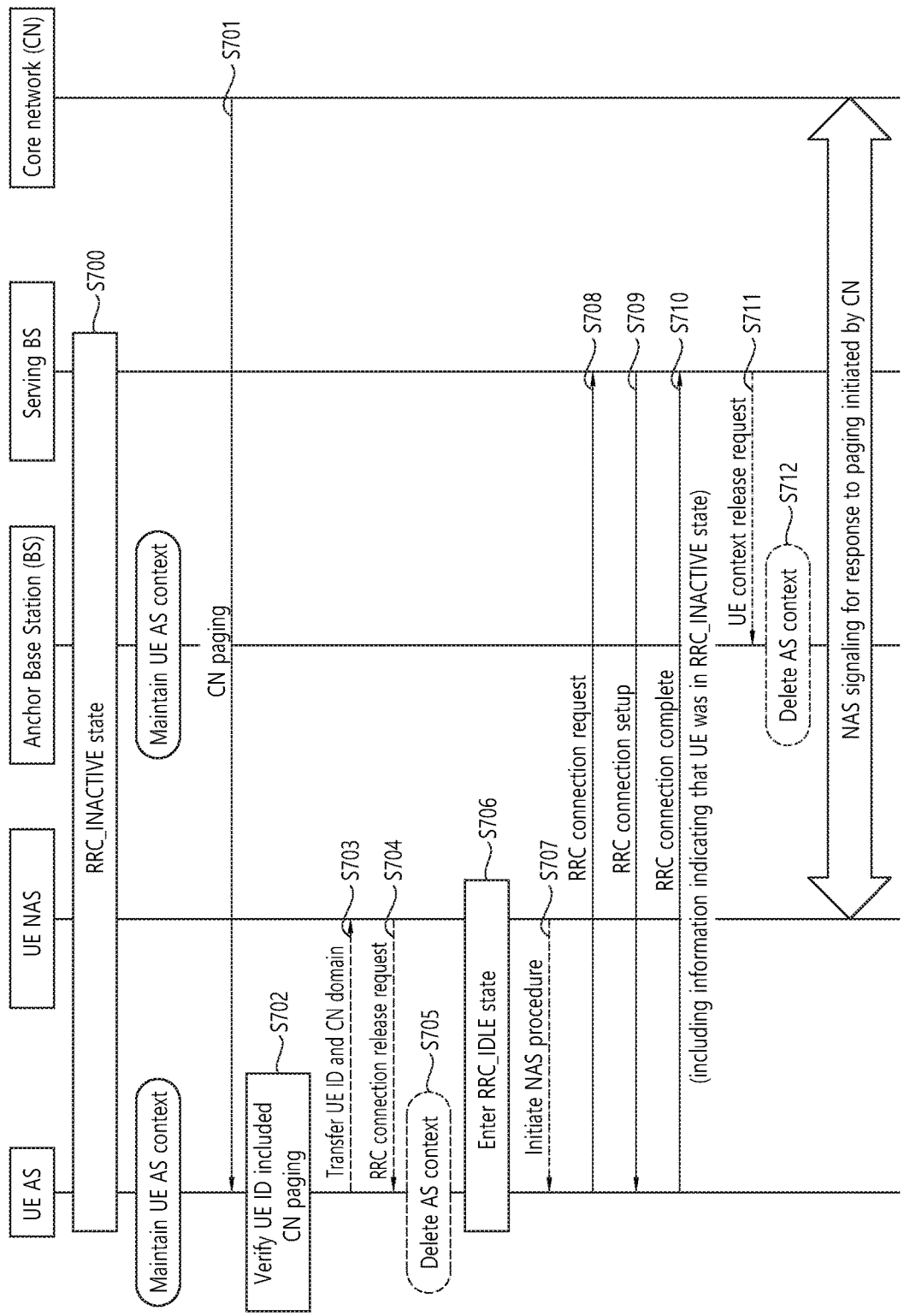
FIG. 7 shows exemplary UE operations, in a case where a UE in an RRC_INACTIVE state receives CN-based paging, according to an exemplary embodiment of the present invention.

FIG. 7 shows exemplary UE operations, in a case where a UE in an RRC_INACTIVE state receives CN-based paging, according to an exemplary embodiment of the present invention.

Referring to FIG. 7, in step S700, a UE may enter an RRC_INACTIVE state. In the RRC_INACTIVE, the UE and an anchor base station may maintain UE AS context.

In step S701, an AS layer of the UE may receive CN paging from a core network. The AS layer may correspond to an RRC layer. The core network may correspond to an AMF. The CN paging may include a PagingRecord, and the PagingRecord may include a ue-Identity and a cn-Domain. The CN paging may be received after a failure of RAN paging.

In step S702, the UE may verify a ue-Identity, which is included in the PagingRecord of the CN paging.

In step S703, if the ue-Identity included in the PagingRecord matches one of the one or more UE identities, which are allocated by upper layers, the AS layer of the UE may forward the ue-Identity and cn-Domain to the NAS layer of the UE during the RRC_INACTIVE state (or condition) of the UE.

In step S704, the NAS layer of the UE may request an autonomous RRC connection release to the AS layer of the UE. More specifically, the NAS layer of the UE may instruct (or direct) the RRC layer of the UE to release the RRC connection by itself. For example, in case the UE is in a lightweight connection state (or condition), regardless of whether or not the NAS layer of the UE acknowledges that the UE is in the lightweight connection state, since the lightweight connection state corresponds to the RRC_CONNECTED state or a subset of the RRC_CONNECTED state, the NAS layer of the UE may request the AS layer of the UE to transition (or shift) the RRC connection state of the UE to the RRC_IDLE state. Thereafter, the AS layer of the UE may perform a procedure for entering the RRC_IDLE state.

In step S705, the UE may delete the stored AS context. When the UE transitions to the RRC_IDLE state, the stored AS context may be deleted. All radio resources may be released for all established RBs. For example, associated PDCP entity, MAC configuration, and RLC entity for all established RBs may be released.

In step S706, the UE may transition to the RRC_IDLE state.

In step S707, after transitioning to the RRC_IDLE state, the NAS layer of the UE may initiate a NAS procedure as a response to the paging. For example, the NAS layer of the UE may initiate a Tracking Area Update (TAU) procedure or a Service Request procedure.

In step S708, the AS layer of the UE may initiate an RRC connection establishment procedure. The RRC layer of the UE may transmit an RRC connection request message to a serving base station. The RRC connection request message may include an InitialUE-Identity and/or an establishment-Cause. The InitialUE-Identity may correspond to an S-TMSI or an IMSI. And, the establishmentCause may correspond to any one of mobile terminating-Access (mt-Access) or CN-based (or CN-initiated) paging.

In step S709, the AS layer of the UE may receive an RRC connection setup message from the serving base station.

In step S710, the AS layer of the UE may transmit an RRC connection setup complete message to the serving base station. The RRC connection setup complete message may include information indicating that the UE was in the RRC_INACTIVE state. The UE may notify to the base station that the RRC connection setup complete message corresponds to a response to the CN paging during the RRC_INACTIVE state. The information may correspond to information indicating that the UE was in the RRC_INACTIVE state, such as a Resume ID, a C-RNTI, or an ID of a last serving cell.

Alternatively, the RRC connection request message may include information indicating that the UE was in the RRC_INACTIVE state. The UE may notify to the base station that the RRC connection request message corresponds to a response to the CN paging during the RRC_INACTIVE state.

In step S711, the serving base station may transmit a UE context release request to an anchor base station. If necessary, the base station, which has received a message including (or containing) information indicating that the UE was in the RRC_INACTIVE state, may request a context release procedure to an anchor base station. The message may correspond to the RRC connection request message or the RRC connection setup complete message.

In step S712, the anchor base station may delete the stored AS context.

Figure 8:
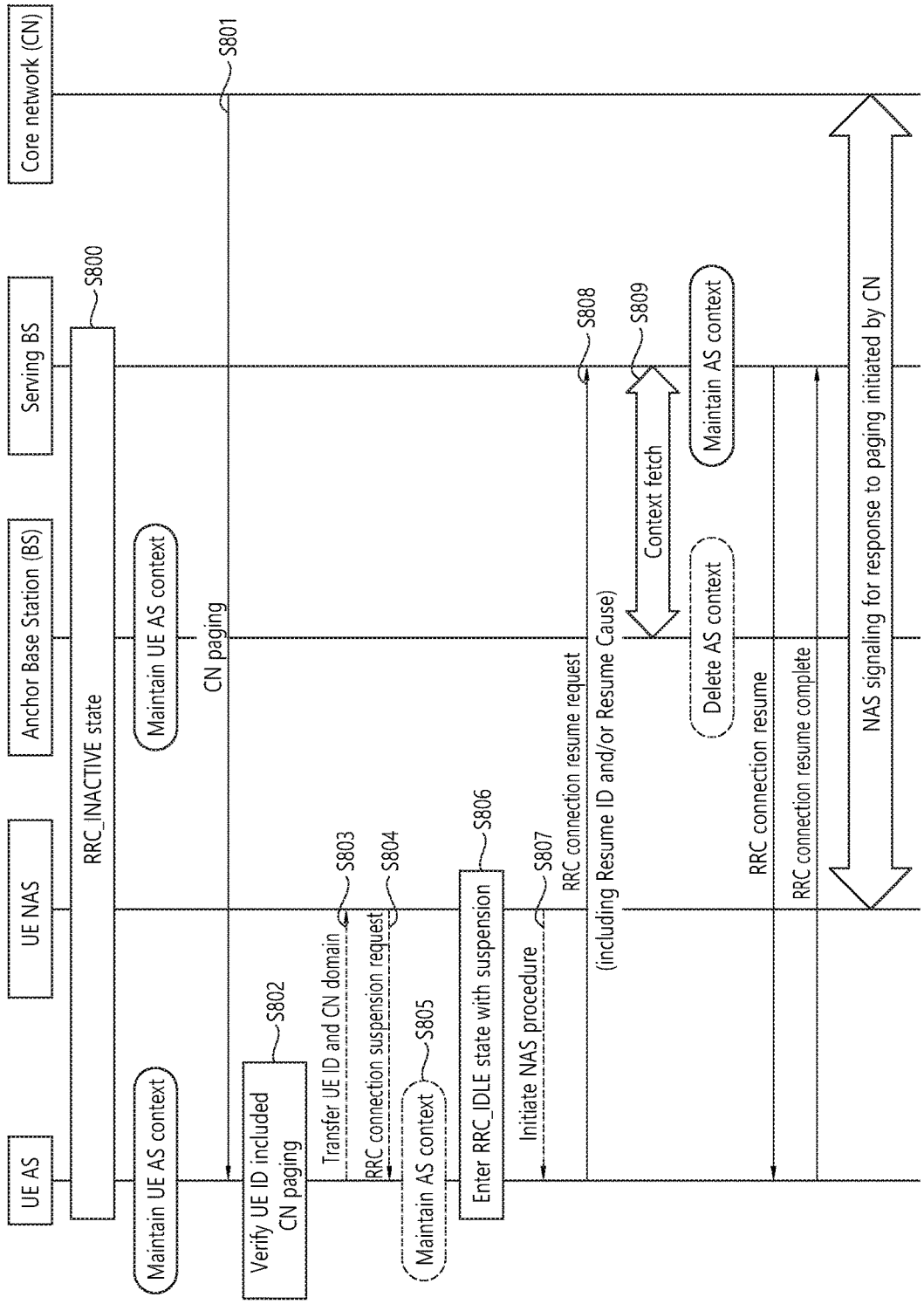
FIG. 8 shows exemplary UE operations, in a case where a UE in an RRC_INACTIVE state receives CN-based paging, according to an exemplary embodiment of the present invention.

FIG. 8 shows exemplary UE operations, in a case where a UE in an RRC_INACTIVE state receives CN-based paging, according to an exemplary embodiment of the present invention.

Referring to FIG. 8, in step S800, a UE may enter an RRC_INACTIVE state. In the RRC_INACTIVE, the UE and an anchor base station may maintain UE AS context.

In step S801, an AS layer of the UE may receive CN paging from a core network. The AS layer may correspond to an RRC layer. The core network may correspond to an AMF. The CN paging may include a PagingRecord, and the PagingRecord may include a ue-Identity and a cn-Domain. The CN paging may be received after a failure of RAN paging.

In step S802, the UE may verify a ue-Identity, which is included in the PagingRecord of the CN paging.

In step S803, if the ue-Identity included in the PagingRecord matches one of the one or more UE identities, which are allocated by upper layers, the AS layer of the UE may forward the ue-Identity and cn-Domain to the NAS layer of the UE during the RRC_INACTIVE state (or condition) of the UE.

In step S804, the NAS layer of the UE may request an autonomous RRC connection suspension to the AS layer of the UE. More specifically, the NAS layer of the UE may instruct (or direct) the RRC layer of the UE to suspend the RRC connection by itself. For example, in case the UE is in a lightweight connection state (or condition), regardless of whether or not the NAS layer of the UE acknowledges that the UE is in the lightweight connection state, since the lightweight connection state corresponds to the RRC_CONNECTED state or a subset of the RRC_CONNECTED state, the NAS layer of the UE may request the AS layer of the UE to transition (or shift) the RRC connection state of the UE to an RRC_IDLE state with suspension. Thereafter, the AS layer of the UE may perform a procedure for entering the RRC_IDLE state with suspension.

In step S805, the UE may maintain the stored AS context.

In step S806, the UE may transition (or shift) to an RRC_IDLE state with suspension.

In step S807, after transitioning to the RRC_IDLE state with suspension, the NAS layer of the UE may initiate a NAS procedure as a response to the paging. For example, the NAS layer of the UE may initiate a Tracking Area Update (TAU) procedure or a Service Request procedure.

In step S808, the AS layer of the UE may initiate an RRC connection resume procedure. The RRC layer of the UE may transmit an RRC connection resume request message to a serving base station. The RRC connection resume request message may include a resumeIdentity and/or a ResumeCause. The resumeIdentity may correspond to an ID, which is received when transitioning (or shifting) to the RRC_INACTIVE state. And, the ResumeCause may correspond to any one of mobile terminating-Access (mt-Access) or CN-based (or CN-initiated) paging.

In step S809, the serving base station may perform a context fetch with an anchor base station. If necessary, a RAN node, which has received the RRC connection resume request from the UE, may perform a context fetch with the anchor RAN node and may, then, establish a connection between the RAN node and the core network (CN).

According to an exemplary embodiment of the present invention, in case the UE being in the RRC_INACTIVE state receives a CN-based paging, the UE may transition (or shift) to RRC_IDLE state or RRC_IDLE state with suspension. And, thereafter, the UE may perform NAS signaling as a response to the CN-based paging.

Figure 9:
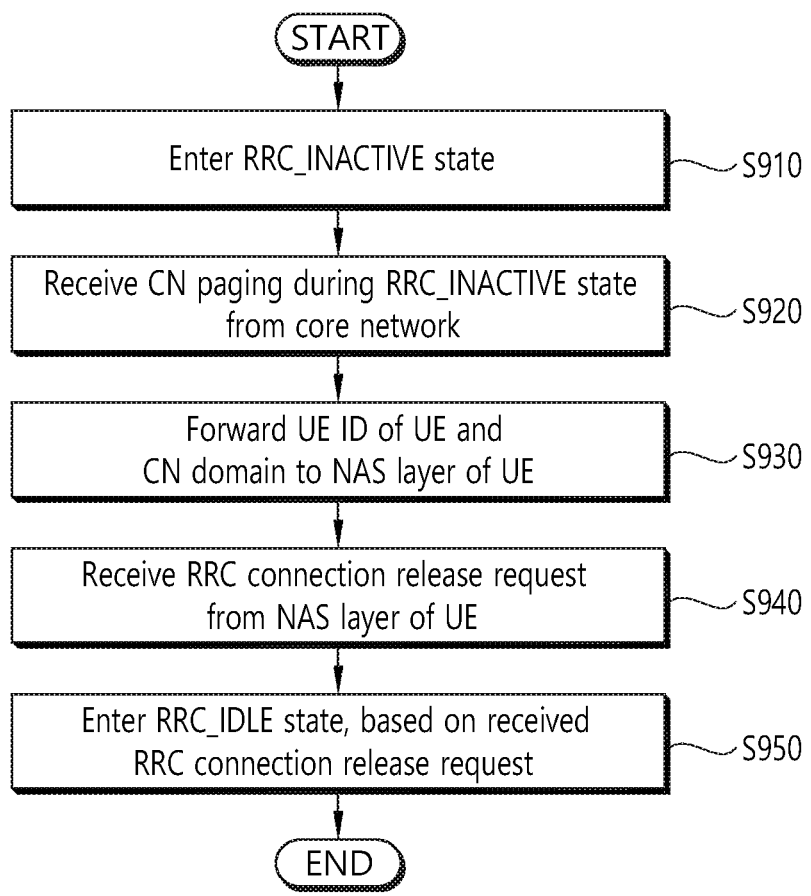
FIG. 9 is a block diagram showing a method for determining an RRC state by an AS layer of a UE according to an exemplary embodiment of the present invention.

FIG. 9 is a block diagram showing a method for determining an RRC state by an AS layer of a UE according to an exemplary embodiment of the present invention.

Referring to FIG. 9, in step S910, an AS layer of the UE may enter an RRC_INACTIVE state. The AS layer of the UE may correspond to a radio resource control (RRC) layer of the UE.

In step S920, the AS layer of the UE may receive a core network (CN) paging during the RRC_INACTIVE state from the core network. The core network may correspond to an Access and Mobility Function (AMF).

Additionally, the AS layer of the UE may verify whether or not a UE ID of the UE matches a UE ID included in the CN paging. The UE ID of the UE may be allocated by a non-access stratum (NAS) layer of the UE.

In step S930, the AS layer of the UE may forward the UE ID of the UE and a CN domain to the NAS layer of the UE. If it is verified that the UE ID of the UE matches the UE ID included in the CN paging, the UE ID of the UE and the CN domain may be forwarded to the NAS layer of the UE.

In step S940, the AS layer of the UE may receive an RRC connection release request from the NAS layer of the UE.

In step S950, the AS layer of the UE may enter an RRC_IDLE state based on the received RRC connection release request.

Additionally, if the RRC connection release request is received from the NAS layer of the UE, the AS layer of the UE may delete AS context being stored in the UE.

Additionally, the AS layer of the UE may initiate an RRC connection setup procedure as a response to the CN paging. The RRC connection setup procedure may be initiated by the NAS layer of the CN. Information indicating that the UE was in the RRC_INACTIVE state may be transmitted to the core network by performing the RRC connection setup procedure. The information may correspond to any one of a Resume ID of the UE, a C-RNTI of the UE, or an ID of a last serving cell.

Figure 10:
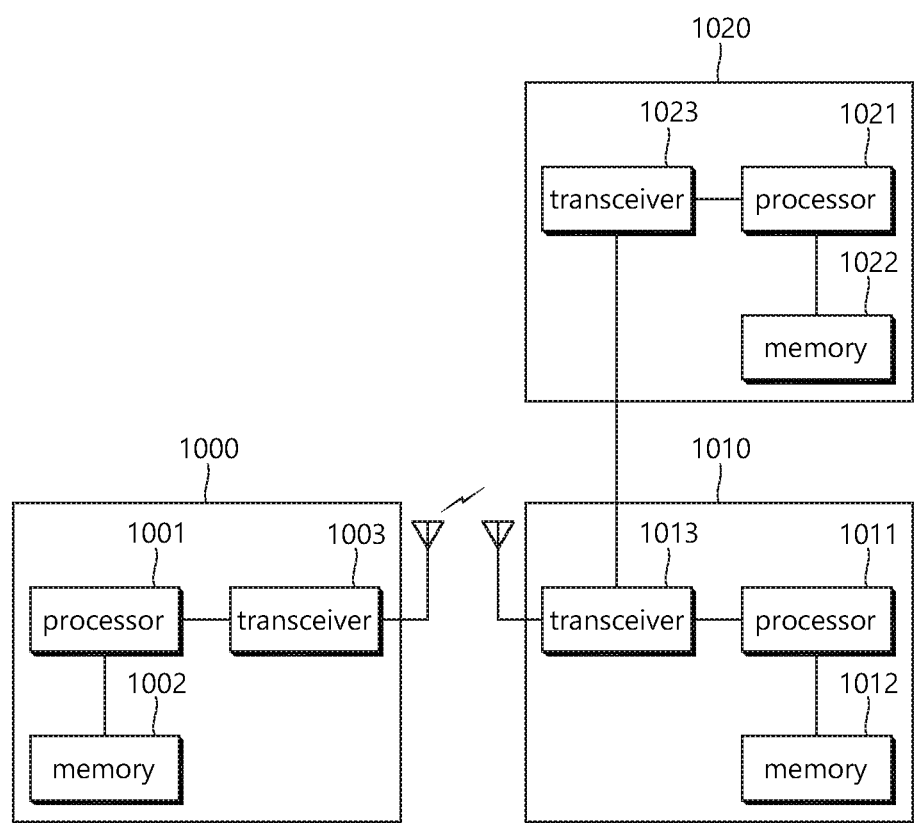
FIG. 10 is a block diagram illustrating a wireless communication system according to the embodiment of the present invention.

FIG. 10 is a block diagram illustrating a wireless communication system according to the embodiment of the present invention.

A UE (1000) includes a processor (1001), a memory (1002), and a transceiver (1003). The memory (1002) is connected to the processor (1001) and stores various information for driving the processor (1001). The transceiver (1003) is connected to the processor (1001), and transmits and/or receives radio signals. The processor (1001) implements proposed functions, processes and/or methods. In the above embodiment, an operation of the UE may be implemented by the processor (1001).

A BS (1010) includes a processor (1011), a memory (1012), and a transceiver (1013). The memory (1012) is connected to the processor (1011) and stores various information for driving the processor (1011). The transceiver (1013) is connected to the processor (1011), and transmits and/or receives radio signals. The processor (1011) implements proposed functions, processes and/or methods. In the above embodiment, an operation of the BS may be implemented by the processor (1011).

A MME/AMF (1020) includes a processor (1021), a memory (1022), and a transceiver (1023). The memory (1022) is connected to the processor (1021), and stores various information for driving the processor (1021). The transceiver (1023) is connected to the processor (1021) and transmits and/or receives radio signals. The processor (1021) implements proposed functions, processes and/or methods. In the above embodiment, an operation of the MME/AMF may be implemented by the processor (1021).

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the afore-mentioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for determining, by an access stratum (AS) of a user equipment (UE), a radio resource control (RRC) state in a wireless communication system, the method comprising:
    entering an RRC_INACTIVE state;
    receiving core network (CN) paging during the RRC_INACTIVE state from an access and mobility function (AMF),
    wherein the UE and a base station are mis-synchronized;
    forwarding a first UE ID of the UE and a CN domain to a non-access stratum (NAS) of the UE;
    receiving an RRC connection release request from the NAS of the UE;
    entering an RRC_IDLE state, based on the received RRC connection release request; and
    initiating an RRC connection setup procedure based on the UE which is in the RRC_IDLE state, in response to the CN paging which is received while the UE is in the RRC_INACTIVE state,
    wherein information which represents that the UE was in the RRC_INACTIVE state before entering the RRC_IDLE state is transmitted to the AMF by performing the initiated RRC connection setup procedure, and
    wherein the information includes at least one of a Resume ID of the UE which is related to the RRC_INACTIVE state, a cell radio network temporary identifier (C-RNTI) of the UE which is related to the RRC_INACTIVE state, or an ID of a last serving cell which is related to the RRC_INACTIVE state.

2. The method of claim 1, further comprising:
    verifying whether the first UE ID of the UE matches a second UE ID included in the CN paging.

3. The method of claim 2, wherein the first UE ID of the UE and the CN domain are forwarded to the NAS of the UE based on the verification that the first UE ID of the UE matches the second UE ID.

4. The method of claim 1, wherein the first UE ID of the UE is allocated by the NAS of the UE.

5. The method of claim 1, further comprising:
    deleting AS context stored in the UE based on receiving the RRC connection release request.

6. The method of claim 1, wherein the RRC connection setup procedure is initiated by the NAS of the UE.

7. The method of claim 1, wherein the AS of the UE includes a radio resource control (RRC) of the UE.

8. The method of claim 1, wherein the UE communicates with at least one of a mobile terminal, a network or autonomous vehicles other than the UE.

9. The method of claim 1, wherein the UE and the base station are mis-synchronized based on the UE having once switched off without a detach procedure or the UE having moved out of a Radio Access Network (RAN) notification area after entering out of service (OOS).

10. A user equipment (UE) determining a radio resource control (RRC) state in a wireless communication system, the UE comprising:
   a memory;
   a transceiver; and
   a processor operatively connecting the memory and the transceiver,
   wherein the processor is configured to:
   enter an RRC_INACTIVE state;
   control the transceiver to receive core network (CN) paging during the RRC_INACTIVE state from an access and mobility function (AMF),
   wherein the UE and a base station are mis-synchronized,
   wherein a first UE ID of the UE and a CN domain are forwarded to a non-access stratum (NAS) of the UE, and
   wherein an RRC connection release request is received by an access stratus (AS) of the UE from the NAS of the UE;
   enter an RRC_IDLE state, based on the received RRC connection release request; and
   initiate an RRC connection setup procedure based on the UE which is in the RRC_IDLE state, in response to the CN paging which is received while the UE is in the RRC_INACTIVE state,
   wherein information which represents that the UE was in the RRC_INACTIVE state before entering the RRC_IDLE state is transmitted to the AMF by performing the initiated RRC connection setup procedure, and
   wherein the information includes at least one of a Resume ID of the UE which is related to the RRC_INACTIVE state, a cell radio network temporary identifier (C-RNTI) of the UE which is related to the RRC_INACTIVE state, or an ID of a last serving cell which is related to the RRC_INACTIVE state.

11. The user equipment of claim 10, wherein the first UE ID of the UE and the CN domain are forwarded to the NAS of the UE based on a verification that the first UE ID of the UE matches a second UE ID included in the CN paging.

12. The user equipment of claim 10, wherein the first UE ID of the UE is allocated by the NAS of the UE.

* * * * *